INVENTOR.
Howard M. Geyer
BY
Craig V. Morton
His Attorney

United States Patent Office 2,773,485
Patented Dec. 11, 1956

2,773,485

SELF-LOCKING ACTUATOR

Howard M. Geyer, Dayton, Ohio, assignor to General Motors Corporation, Detroit, Mich., a corporation of Delaware Application September 9, 1954, Serial No. 454,916

11 Claims. (Cl. 121—40)

This invention pertains to actuators and particularly to fluid pressure operated rotary actuators including locking means.

Heretofore, fluid pressure operated rotary actuators have embodied means for locking the movable actuator member at the ends of its stroke. That is, the actuator could only be locked when it was either completely extended or completely retracted. The rotary actuator of this invention can be locked in any position of the movable actuator member, and in addition, the locking means are automatically operable to positively restrain actuator movement upon a loss of pressure in the operating system therefor. Accordingly, among my objects are the provision of a rotary actuator including releasable locking means; the further provision of rotary actuator including locking means and fluid pressure operated means for releasing the locking means upon application of fluid pressure to the actuator; and the still further provision of a rotary actuator including locking means and means for engaging the locking means in the absence of fluid pressure application to the actuator.

The aforementioned and other objects are accomplished in the present invention by incorporating mechanical locking means which are engageable by resilient means and releasable by fluid pressure operated means. Specifically, the actuator includes a cylinder having disposed therein a reciprocable piston capable of fluid pressure actuation in both directions. The piston is formed with a skirt having helical spline teeth on its external and internal surfaces. The external spline teeth of the skirt engage helical spline teeth formed on the internal periphery of a portion of the cylinder, and the internal spline teeth of the skirt engage helical spline teeth formed on an output member, or shaft, rotatably journaled in the cylinder. In an installation, the cylinder must be attached to a fixed support so as to prevent rotation as well as linear movement thereof.

The piston divides the cylinder into an extend chamber and a retract chamber which are connected with ports enabling the application and drain of fluid from either chamber. In addition, the piston carries a centrally disposed, hollow, tubular extension within which a hollow screw shaft having a spiral groove of semi-circular cross section extends. The screw shaft, or element, is rotatably supported in the cylinder and constitutes a component of the well known ball, screw and nut coupling. The piston also carries a nut having a complementary spiral groove, the nut being constrained for movement with the piston, and operatively connected with the screw shaft by means of a plurality of circulating balls. Accordingly, reciprocation of the piston is dependent upon and effects relative rotation between the nut and screw shaft. Moreover, by reason of the helical spline connection between the piston and the cylinder, and between the piston and the output member, the piston will experience a slight angular movement during reciprocation, while the output member will experience a substantial angular movement.

The locking means are operatively connected with the screw shaft, so that when engaged, the locking means will prevent piston movement by restraining rotation of the screw shaft. In the preferred embodiment the locking means comprise a multiple disc type friction brake including a plurality of axially spaced discs which are rotatably connected to the screw shaft, and a plurality of intermeshing axially spaced discs which are carried by the stationary cylinder. The brake discs connected with the screw shaft are adapted for axial movement into and out of engagement with the stationary brake discs. A spring is employed to effect engagement of the brake discs, while a fluid pressure operated piston is arranged to disengage the brake discs.

In another embodiment the locking means comprise a dog-tooth type brake including a member rotatably connected to the screw shaft and movable axially relative thereto, and the end wall of the cylinder, each having formed thereon an annular row of circumferentially spaced teeth. In a similar manner, the tooth surfaces are engaged by a spring, and disengaged by actuation of a lock release piston. Operation of both actuators is identical in that upon application of pressure fluid to either cylinder chamber, while the other chamber is connected to drain, pressure fluid is concurrently supplied to the lock release cylinder so as to release the locking means and permit rotation of the screw shaft and angular movement of the output member. Any suitable valve means may be employed to effect concurrent application of pressure fluid to the lock releasing means upon the application of pressure fluid to either cylinder chamber. For example, valve means of the type disclosed in a co-pending application, Serial No. 394,660, filed November 27, 1953, may be employed.

Further objects and advantages of the present invention will be apparent from the following description, reference being had to the accompanying drawings wherein preferred embodiments of the present invention are clearly shown, and wherein similar reference characters denote similar parts throughout the several views.

Figure 1:
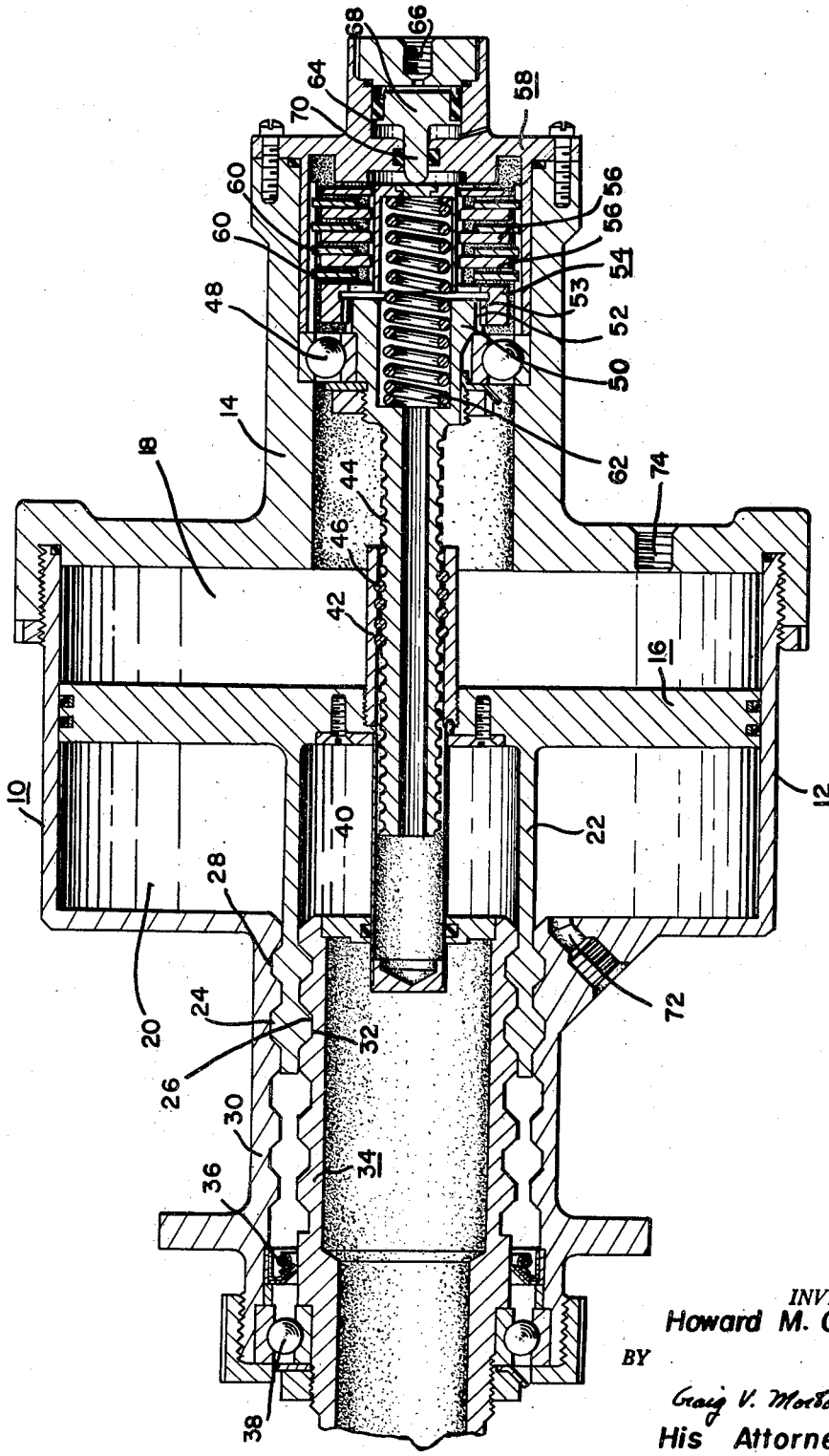
Figure 1 is a longitudinal sectional view of an actuator constructed according to this invention.

With particular reference to Figure 1, an actuator 10 is depicted as including a cylinder 12, one end of which has attached thereto an end cap 14. The cylinder has disposed therein a reciprocable piston 16 capable of fluid pressure actuation in either direction, the piston dividing the cylinder into an extend chamber 18 and a retract chamber 20. It is to be understood that in an installation, the cylinder 12 will be attached to a fixed support so as to preclude linear as well as rotary movement thereof.

The piston 16 has opposed surfaces of equal area and is formed with an integral, axially extending skirt 22 having a series of helical spline teeth 24 on its external surface and a series of helical spline teeth 26 on its internal surface. The external spline teeth 24 engage internal helical spline teeth 28 formed on a tubular extension 30 of the cylinder, while the internal helical spline teeth 26 engage spline teeth 32 formed on the external surface of an output member, or shaft, 34. Suitable sealing means 36 are carried by the tubular extension 30, the sealing means having engagement with the member 34 so as to prevent the leakage of fluid from the retract chamber 20. The member 34 is rotatably journaled in the tubular extension 30 by means of a ball bearing assembly 38, the inner race of which is attached to and carried by the tubular member 34, and the outer race of which is attached to and carried by the stationary tubular extension 30 of the cylinder.

From the foregoing, it will be apparent that upon reciprocation of the piston 16, the piston 16 will have imparted thereto a slight angular movement due to its helical spline connection with the tubular extension 30 of the cylinder. Moreover, during reciprocation of the piston 16 the output member 34 will have imparted thereto substantial angular movement due to its helical spline connection with the piston skirt. It should be noted that the angular movement imparted to the member 34 is equal to the sum of the leads of the helical spline teeth 28, 24, 26 and 32.

The piston 16 presents surfaces to the retract for extend chambers which are of substantailly equal area. In addition, the piston 16 is centrally apertured, and carries a centrally disposed hollow, tubular extension 40. The piston 16 also has attached thereto, and constrained for movement therewith, a nut 42 having an internal spiral groove of semicircular cross-section. The nut engages a complementary grooved screw shaft 44 through the agency of a plurality of circulating balls 46, the assembly constituting the well known ball, screw and nut coupling. The circulating passage for the balls is not shown in the drawings. Accordingly, it will be appreciated that reciprocation of the piston 16 is dependent upon, and effects, rotation of the screw shaft 44. Thus, if the screw shaft 44 is restrained against rotation, the piston 16 will be locked against movement.

The screw shaft 44 is rotatably journaled by ball bearing means 48 within the cylinder end cap 14. As is depicted in Figure 1, the inner race of bearing means 48 is attached to and carried by the screw shaft 44, while the outer race is attached to and carried by the cap 14. Furthermore, the screw shaft 44 is formed with a centrally recessed end portion 50 having external straight spline teeth 52. The external straight spline teeth 52 are engaged by straight spline teeth 53 on a cup-shaped element 54, whereby the element 54 is constrained for rotation with the screw shaft 48, but is capable of axial movement relative thereto. The cup-shaped element 54 carries a plurality of spaced, annular brake discs 56, which constitute a component of the preferred locking means to be described.

As is depicted in Figure 1, the cap member 14 is formed with an open end which is closed by a cup-shaped cover assembly 58, which is suitably connected thereto. The cup-shaped cover assembly 58 is thus restrained against rotation and carries a plurality of spaced annular brake discs 60, which are interposed between the brake discs 56. A lock engaging spring 62 is disposed within the centrally recessed portion 50 of the screw shaft, one end of the spring 62 seating against the cup-shaped element 54 so as to normally maintain the brake discs 56 and 60 in engagement. In this manner rotation of the screw shaft 44 is prevented, thereby locking the piston 16 against movement.

The lock releasing means of this invention include a cylinder 64 which is formed within the cup-shaped cover assembly 58, the cylinder 64 having communication with a lock release port 66. The cylinder 64 has disposed therein a lock release piston 68 capable of fluid pressure actuation to the left, as viewed in Figure 1. The lock release piston 68 includes an integral rod 70 which projects through the end wall cylinder 64 and engages the cup-shaped element 54. Thus, upon the application of pressure fluid to the cylinder 64, the piston 68 will be moved to the left, thereby imparting axial movement to the element 54 so as to disengage brake discs 56 and 60. In this manner the locking means will be released so as to permit rotation of screw shaft 44, and hence permit movement of piston 16 and the output member 34.

As seen in Figure 1, the cylinder 10 is formed with a retract port 72 having communication with the retract chamber 20, while the cap 14 is formed with an extend port 74 having communication with the extend chamber 18. Moreover, in an actual installation the ports 66, 72, and 74 may be interconnected through suitable valve means of the type disclosed in my aforementioned application, so that upon application of pressure to either cylinder chamber, pressure fluid is concurrently applied to the lock release cylinder. Moreover, in the absence of fluid pressure application to either cylinder chamber, the lock release cylinder is connected to drain, thereby permitting the spring 62 to engage the brake discs 56 and 60 to lock the actuator in the then adjusted position.

Figure 2:
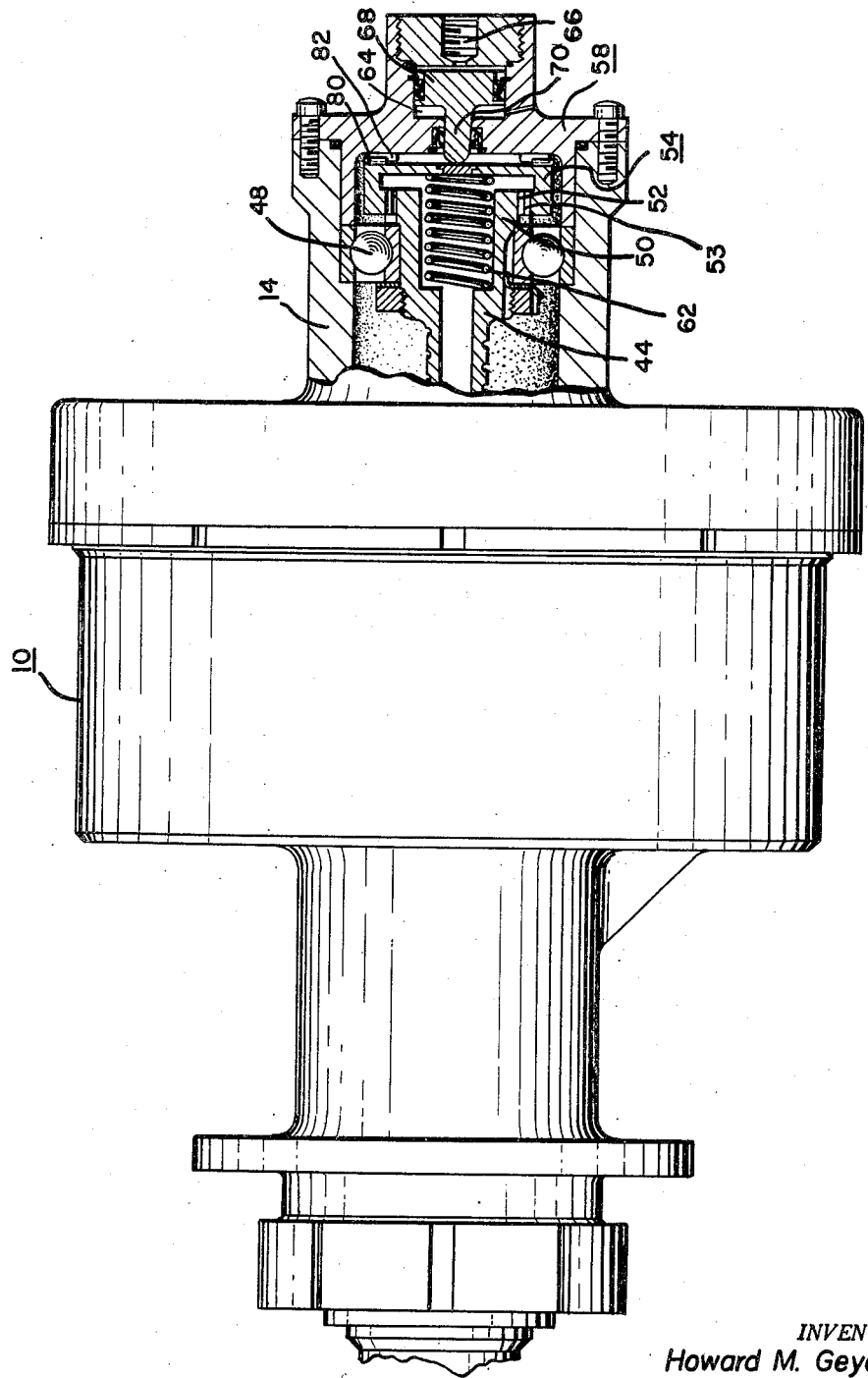
Figure 2 is a view, partly in section and partly in elevation, of an actuator including modified locking means.

With reference to Figure 2, modified locking means for an actuator of the type described in conjunction with Figure 1, are disclosed. The actuator 10 of Figure 2 is similar in all other respects to the actuator of Figure 1. Thus, the cap member 14 has attached thereto the cup-shaped cover assembly 58 which is formed to constitute the lock release cylinder 64 having disposed therein the lock release piston 68, the cylinder 64 communicating with the lock release port 66. In a similar manner the screw shaft 44 includes a centrally recess end portion 50 which is rotatably journaled by bearing means 48. The portion 50 is formed with external straight spline teeth 52 which engage straight spline teeth 53 on the cup-shaped element 54. However, in the modified embodiment 52, the cup-shaped element 54 is formed with an annular row of circumferentially spaced, radially arranged teeth 80, adapted to intermesh with a complementary annular row of teeth 82 formed on the bottom wall of the cup-shaped cover assembly 58. The spring 62 is employed to engage the tooth surfaces so as to restrain the screw shaft 44 while the rod 70 of the piston 68 adapted to engage the element 54 so as to disengage the tooth surfaces.

Although the operation is believed to be obvious from the foregoing description, a resume of the operation is as follows. In the absence of fluid pressure application to either of the actuator cylinder chambers, the spring 62 will engage the locking means so as to prevent rotation of the screw shaft, thereby preventing movement of the piston and the output member. This result is achieved inasmuch as the lock release cylinder is connected to drain when pressure fluid is not applied to either cylinder chamber. However, upon the application of pressure fluid to either cylinder chamber, fluid pressure is concurrently applied to the lock release cylinder so as to release the locking means, thereby permitting rotation of the screw shaft, and movement of the piston and output member.

While the embodiments of the present invention as herein disclosed, constitute preferred forms, it is to be understood that other forms might be adopted.

What is claimed is as follows:

1. A fluid pressure operated rotary actuator, including in combination, a cylinder, a reciprocable piston disposed in said cylinder capable of fluid pressure actuation in either direction, an output member rotatably supported in said cylinder, means interconnecting said piston and said output member for imparting rotation to said output member upon reciprocation of said piston, and releasable locking means operatively connected with said piston for preventing movement thereof and hence locking said output member against movement, said locking means being independent of said rotary output member.

2. A fluid pressure operated rotary actuator, including in combination, a cylinder, a reciprocable piston disposed in said cylinder capable of fluid pressure actuation in both directions, an output member rotatably supported in said cylinder, means interconnecting said piston and said output member for imparting rotation to said output member upon reciprocation of said piston, locking means operatively connected with said piston for preventing movement thereof and hence locking said output member against movement, said locking means being independent of said rotary output member, and fluid pressure operated means for releasing said locking means upon application of fluid pressure to said cylinder so as to permit movement of said piston and said output member.

3. A fluid pressure operated rotary actuator, including in combination, a cylinder, a reciprocable piston disposed in said cylinder capable of fluid pressure actuation in both directions, an output member rotatably supported in said cylinder, a helical spline connection between said piston and said output member whereby reciprocation of said piston will impart rotation to said output member, and releasable locking means operatively connected with said piston for preventing movement thereof and hence locking said output member against movement, said locking means being independent of said rotary output member.

4. A fluid pressure operated rotary actuator, including in combination, a cylinder, a reciprocable piston disposed in said cylinder capable of fluid pressure actuation in both directions, an element rotatably supported in said cylinder and operatively connected with said piston such that movement of said piston is dependent upon and effects rotation of said element, an output member rotatably supported in said cylinder and operatively connected with said piston such that piston reciprocation will impart rotation to said output member, and releasable locking means operatively connected with said rotatable element for restraining rotation thereof and hence preventing movement of said piston and said output member.

5. A fluid pressure operated rotary actuator, including in combination, a cylinder, a reciprocable piston disposed in said cylinder capable of fluid pressure actuation in both directions, an element rotatably supported in said cylinder and operatively connected to said piston such that piston reciprocation is dependent upon and effects rotation of said element, an output member rotatably supported in said cylinder and having helical spline connection with said piston such that piston reciprocation will impart rotation to said output member, locking means operatively connected with said element for restraining rotation thereof and hence locking said piston and said output member against movement, and means operatively associated with said locking means for releasing the said locking means upon application of fluid pressure to said cylinder.

6. The combination set forth in claim 5 wherein the operative connection between said piston and said rotary element includes a nut constrained for movement with said piston, said nut having threaded engagement with said element whereby piston reciprocation will effect and is dependent upon rotation of said element.

7. The combination set forth in claim 5 wherein the locking means comprise a multiple disc brake having two sets of engageable discs, one set of brake discs being carried by and rotatable with said element, and the other set of brake discs being carried by said cylinder.

8. The combination set forth in claim 5 wherein said locking means comprises a dog tooth type brake having engageable toothed surfaces, one of said toothed surfaces being attached to and rotatable with said rotatable element, and the other of said toothed surfaces being formed on said cylinder.

9. An actuator assembly, including in combination, a cylinder, a reciprocable piston disposed in said cylinder, an element rotatably supported in said cylinder and operatively connected to said piston so as to rotate in response to piston reciprocation, an output member rotatably supported in said cylinder, means interconnecting said output member and said piston for imparting rotation to said output member upon piston reciprocation, and releasable locking means operatively connected with said element for restraining rotation of said element and, consequently, preventing movement of said piston and said output member when the actuator is inactive.

10. An actuator assembly, including in combination, a cylinder, a reciprocable piston disposed in said cylinder, an element rotatably supported in said cylinder and operatively connected to said piston so as to rotate in response to piston reciprocation, the operative connection between said piston and said rotatable element including a non-rotatable element constrained for movement with said piston and having operative engagement with said rotatable element whereby relative rotation will occur between said elements in response to piston reciprocation, an output member rotatably supported in said cylinder and having helical spline connection with said piston whereby piston reciprocation will impart rotation to said output member, and releasable locking means operatively connected with said rotatable element for restraining rotation thereof and, consequently, preventing movement of said piston and said output member when the actuator is inactive.

11. An actuator assembly, including in combination, a cylinder, a reciprocable piston disposed in said cylinder, a screw shaft rotatably supported in said cylinder and operatively connected to said piston so as to rotate in response to piston reciprocation, the operative connection between said piston and said screw shaft including a nut fixedly attached to said piston and threadedly engaging said screw shaft, an output member rotatably supported in said cylinder, said piston having a skirt with interior and exterior helical splines, the exterior helical splines of said skirt engaging helical splines on said cylinder, the interior helical splines on said skirt engaging helical splines on said rotary output member whereby piston reciprocation will impart rotation to said output member, and releasable locking means operatively connected with said screw shaft for restraining rotation thereof and, consequently, preventing movement of said piston and said rotary output member when the actuator is inactive.

References Cited in the file of this patent

UNITED STATES PATENTS

| | | |
|---|---|---|
| 2,643,642 | Geyer | June 30, 1953 |
| 2,660,028 | Geyer | Nov. 24, 1953 |